United States Patent [19]

Heimburg

[11] Patent Number: 4,773,360

[45] Date of Patent: Sep. 27, 1988

[54] INTERNAL COMBUSTION ENGINE

[75] Inventor: Fritz Heimburg, Nauheim, Fed. Rep. of Germany

[73] Assignee: General Motors Corporation, Detroit, Mich.

[21] Appl. No.: 71,852

[22] Filed: Jul. 10, 1987

[30] Foreign Application Priority Data

Jul. 17, 1986 [DE] Fed. Rep. of Germany ....... 3624107

[51] Int. Cl.[4] .................................................. F01L 1/26

[52] U.S. Cl. ................................ 123/90.23; 123/90.4; 123/90.44; 123/90.27

[58] Field of Search ................. 123/90.23, 90.22, 90.4, 123/90.44, 90.39, 90.27

[56] References Cited

U.S. PATENT DOCUMENTS

| | | | |
|---|---|---|---|
| 4,527,518 | 7/1985 | Osaki et al. | 123/90.23 |
| 4,549,510 | 10/1985 | Miyakoshi et al. | 123/90.27 |
| 4,558,667 | 12/1985 | Inagaki et al. | 123/90.27 |
| 4,649,874 | 3/1987 | Sonoda et al. | 123/90.27 |

FOREIGN PATENT DOCUMENTS

| | | | |
|---|---|---|---|
| 178911 | 9/1985 | Japan | 123/90.23 |
| 49114 | 3/1986 | Japan | 123/90.6 |

*Primary Examiner*—E. Rollins Cross
*Attorney, Agent, or Firm*—Arthur N. Krein

[57] ABSTRACT

Each cylinder of an engine is provided with a pair of intake valves and a pair of exhaust valves arranged opposite each other in a V-like pattern and are driven by an overhead camshaft having an associate intake cam lobe for the intake valves and separate exhaust cam lobes on opposite sides of the intake cam lobe. A single direct acting bucket-type tappet journaled in the engine cylinder head is acted on by the intake cam lobe to control opening and closing movement of the pair of intake valves. Each exhaust valve is actuated by an associate intake cam lobe via a valve train that includes a tappet, push rod and a rocker arm, with an integral hydraulic lash adjuster, pivotably supported on a common rocker shaft.

1 Claim, 1 Drawing Sheet

INTERNAL COMBUSTION ENGINE

FIELD OF THE INVENTION

The invention relates to an internal combustion engine of the type having at least one cylinder that is provided with two intake and two exhaust valves. The cylinder has a spark plug or injection nozzle mounted in the center of the its cylinder head, and the intake and exhaust valves are arranged on different sides of the cylinder so as to form a V-like pattern with one another. On one side of the cylinder there is arranged one single overhead camshaft for actuating all four valves, the arrangement being such that each of the two valves disposed opposite the camshaft are actuated by a cam and a cam follower device which is extending across the cylinder to the other side thereof.

DESCRIPTION OF THE PRIOR ART

An internal combustion engine of this type is described in the German Offenlegungsschrift DE-OS No. 34 24 773. Thus, as well known, various modern internal combustion engines are often equipped with four valves per cylinder to increase engine output, lower fuel consumption and reduce noxious substances in the exhaust gases. To achieve optimum mixture formation and combustion it is preferable that the spark plug or, in the case of diesel engines, the injection nozzle be axially aligned with the cylinder axis. However, this arrangement does not permit an overhead camshaft of the type that is adapted to actuate the valves on both sides of the cylinder to be located between the valves.

In view of these considerations, the German Offenlegungsschrift identified above proposes that only one single camshaft be provided on only one cylinder side. This camshaft has one cam for each valve, with the valves on the camshaft side each being actuated directly by a respective rocker arm driven by a respective cam, and the valves on the other side of the cylinder being actuated indirectly by a respective rocker arm, tappet and a second rocker arm driven by a respective cam of the camshaft. Thus, to actuate the four valves in the cylinder, this arrangement requires the use of four cams and associated motion transmitting elements.

OBJECTS OF THE INVENTION

It is the object of the present invention to provide an internal combustion engine of the type described above in which a camshaft located on one side of the cylinder is capable of actuating all four valves in a relatively simple manner.

This object is accomplished in that the valves on the side of the camshaft are each bearing, by means of their respective valve stems, against a common bucket-type tappet which engages the camshaft in the region of one single intake valve cam.

This arrangement will accomplish that only one cam need be provided on the camshaft for actuating the two valves disposed on the camshaft side so that the complexity of an engine having four valves per cylinder is significantly reduced without losing the advantages derived from an arrangement in which the injection nozzle or spark plug is disposed in the center of the cylinder and aligned with the cylinder axis. Furthermore, the arrangement according to the invention can be employed, without the need for any modifications, in both direct injection type diesel and Otto engines, with the attendant benefits of communality in parts and reduced inventory expense.

In accordance with one arrangement, which renders the subject engine relatively simple and inexpensive in construction, the cam follower device includes on the side opposite the camshaft a rocker arm shaft having two rocker arms for actuating the valve stems of the exhaust valves and with a push rod for each rocker arm, with one end of each push rod bearing against a respective rocker arm, and the other end of each push rod bearing against a respective tappet which is in engagement with the camshaft. This will provide that actuation of the valves arranged opposite the camshaft is effected with a minimum of complexity. As compared to the engine according to the German Offenlegungsschrift DE-OS No. 34 24 773 mentioned above, the use of the two tappets per cylinder enables to eliminate two rocker arms per cylinder and one rocker arm shaft with bearings per engine.

It should be appreciated that a variety of arrangements may be utilized in the practice of the invention. One exemplary embodiment is schematically illustrated in the drawings and described in the following.

DESCRIPTION OF A PREFERRED EMBODIMENT

Figure 1:
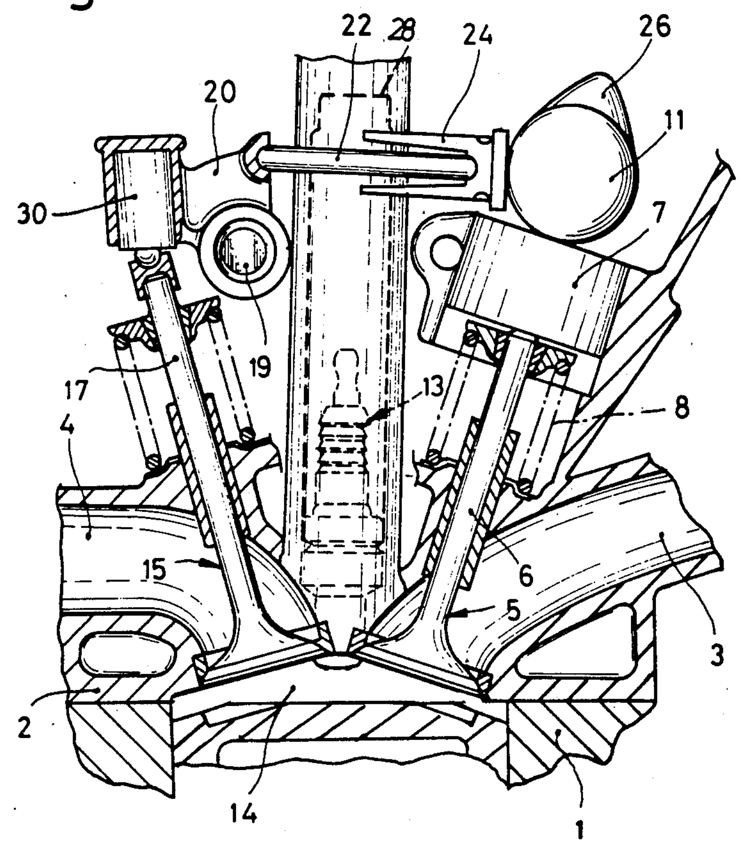
FIG. 1 is a view of the upper portion of a cylinder of the engine according to the invention.

FIG. 1 illustrates schematically the upper portion of a cylinder 1 of an internal combustion engine. On top of cylinder 1 there is provided a cylinder head 2 which has, as apparent in FIG. 1, an intake conduit 3 and an exhaust conduit 4. Fluid communication between the intake port 3 and the cylinder 1 is controlled by an intake valve 5 having a valve stem 6 which is bearing against a bucket-type tappet 7. The intake valve 5 is biased by a coiled compression spring 8 in the valve-closing direction.

Figure 2:
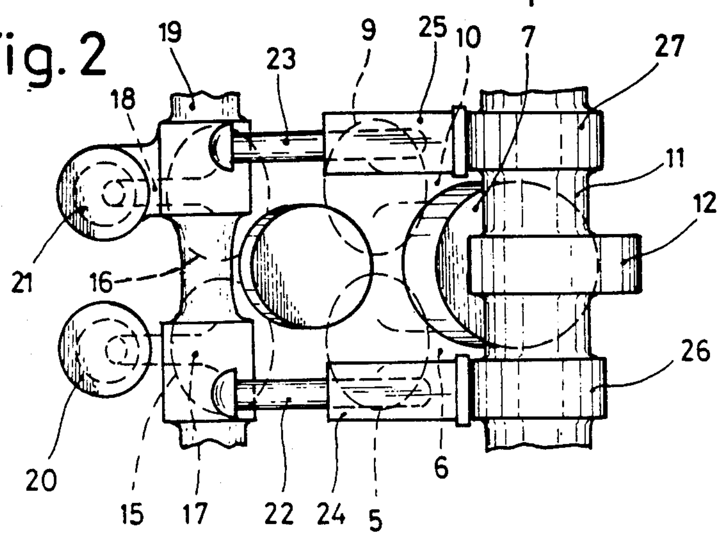
FIG. 2 is a plan view of the arrangement according to the invention.

It is apparent from FIG. 2 that, in addition to the intake valve 5, there is provided a second intake valve 9 which has its valve stem 10, just like the valve stem 6, bearing against the same bucket-type tappet 7. A camshaft 11 illustrated in FIGS. 1 and 2, which is arranged above the bucket-type tappet 7, is adapted to urge, by means of a cam 12, the bucket-type tappet 7 downwardly and to thereby simultaneously open both intake valves 5 and 9. Preferably, the bucket-type tappet is of the type shown in applicant's copending U.S. patent application Ser. No. 071,789, filed July 10, 1987 concurrently herewith and assigned to a common assignee, the disclosure of which is incorporated herein by reference thereto. Preferably the bucket-type tappet has a hydraulic lash adjuster operatively associated therewith, with a portion thereof engaging one side of a reaction member, the opposite side of the reaction member at opposite end thereof engaging the valve stems 6 and 10, the lash adjuster and reaction member not being shown.

It is also apparent from FIG. 1 that the internal combustion engine, in the construction shown, is provided with a spark plug 13 which is arranged coaxially with the axis of the cylinder 1 and which extends centrally into the recess 14 above a piston so as to enable optimum mixture formation and combustion. The two intake valves 5 and 9 form an acute angle with the cylinder axis. On the cylinder side opposite the intake valves 5, 9 there are arranged, at the same angular relationship to the cylinder axis, a pair of exhaust valves 15, 16 for controlling exhaust gas flow from cylinder 1 to exhaust conduit 4 and a second exhaust conduit which is not illustrated in the drawings. As illustrated again in FIG. 2, the exhaust valves 15, 16, too, have valve stems 17, 18, respectively, which are actuated, respectively, by rocker arms 20, 21 mounted for pivoting movement about a rocker arm shaft 19. Each of the rocker arms 20, 21 is provided with an integral hydraulic lash adjuster 30, the lash adjuster 30 in the rocker arm 20 only being shown in FIG. 1.

These rocker arms 20, 21 are adapted to be actuated, respectively, by a pair of horizontally oriented push rods 22, 23 which are extending into associated tappets 24, 25. The tappets 24, 25 are located by and suitably journaled in an overhead support member, not shown, whereby they will operatively bear against. A pair of associated cams 26, 27 on the camshaft 11 are adapted to horizontally displace the tappets 24, 25, as best seen in FIG. 2, and thus the push rods 22, 23, which will cause the respective rocker arms 20, 21 to be pivoted counter-clockwise and so as to open the exhaust valves 15, 16.

In case of a diesel engine, an injection nozzle would be employed instead of a spark plug 13, and in this instance the configuration of the combustion chamber 14 is of the type generally employed in diesel engines to achieve the higher compression ratio. However, this type of combustion chamber is not illustrated in the drawings.

The embodiments of the invention in which an exclusive property or privilege is claimed are defined as follows:

1. In an internal combustion engine in the type having at least one cylinder which is provided with two intake valves and two exhaust valves located in sets in opposed relationship to each other, said cylinder having mounted in the center of its cylinder head a spark plug or an injection nozzle, said intake and exhaust valves being arranged on different sides of the cylinder and forming a V-pattern with each other, and an overhead camshaft, which is adapted to actuate all four valves, being arranged above the cylinder head on one side of the cylinder next adjacent to said two intake valves; the improvement including said camshaft having a central intake cam with separate exhaust cams on opposite sides of said intake cam and axially spaced therefrom for said at least one cylinder; a direct acting hydraulic valve lifter means operatively positioned to be engaged on one side thereof by said intake cam, the opposite side of said direct acting hydraulic valve lifter means being operatively connected to said two intake valves whereby to control opening and closing movement of said two intake valves and to automatically control lash compensation of each of said two intake valves; a rocker shaft operatively supported on said cylinder head on the opposite side of the cylinder next adjacent to said two exhaust valves and positioned in substantially parallel relationship to said overhead camshaft; and, separate valve trains, one operatively associated with each one of said exhaust valves and an associated one of said exhaust cams, each said valve train including a rocker arm having an integral hydraulic lash adjuster pivotably mounted on said rocker shaft at a location so as to operatively engage the associated one of said exhaust valves whereby to control opening and closing movement thereof during pivotal movement of said rocker arm; a slidable tappet engaging the associated one of said exhaust cams; and, a push rod having opposite ends operatively interconnecting said tappet and said rocker arm.

* * * * *